United States Patent
Tunderman

[15] 3,659,700
[45] May 2, 1972

[54] AUGER CONVEYOR

[72] Inventor: William Tunderman, Barstow, Ill.
[73] Assignee: Deere & Company, Moline, Ill.
[22] Filed: Sept. 24, 1970
[21] Appl. No.: 75,122

[52] U.S. Cl. ............................................. 198/213
[51] Int. Cl. ............................................. B65g 33/24
[58] Field of Search ............................ 198/213, 229

[56] References Cited

UNITED STATES PATENTS

| | | |
|---|---|---|
| 1,658,247 | 2/1928 | Lower............................. 198/213 X |
| 2,443,288 | 6/1948 | Anderson............................. 198/213 |

FOREIGN PATENTS OR APPLICATIONS

| | | |
|---|---|---|
| 277,522 | 10/1913 | Germany............................. 198/213 |
| 619,086 | 3/1949 | Great Britain............................. 198/213 |

*Primary Examiner*—Edward A. Sroka
*Attorney*—H. Vincent Harsha, Harold M. Knoth, William A. Murray, John M. Nolan and Raymond L. Hollister

[57] ABSTRACT

An auger conveyor including a cylindrical core tube composed of a spiral-wound strip and having a raised spiral seam on its external surface, and spiral flighting connecting externally to the core tube, the flighting having a spiral inner edge parallel with and abutting the seam of the tube. The core tube and flighting assembly is rotatable relative to a housing to advance material therealong, the housing consisting of a spiral-wound cylindrical tube having an internal raised seam extending in close proximity to the outer edge of the flighting and acting as a stripper therefor.

15 Claims, 3 Drawing Figures

PATENTED MAY 2 1972

3,659,700

*INVENTOR.*
WILLIAM TUNDERMAN

AUGER CONVEYOR

BACKGROUND OF THE INVENTION

The present invention relates generally to material conveyors and more particularly to a conveyor of the screw- or auger-type.

The steps involved in the manufacture of an auger for use in an auger conveyor consist generally of forming the core tube, forming the spiral flighting, and assembling the flighting to the tube. In the case of long, large diameter auger sections, the common and most economical method of forming the core tube consists of rolling flat, rectangular sheet stock into the shape of a cylinder, then welding the overlapped ends together. The product of this method, however, is not entirely satisfactory. For example, it is difficult as a practical matter to produce a tube with a uniform diameter along its length, since the long slender forming rolls required for the forming operation tend to yield slightly at their unsupported centers, thereby forming the tube with a slightly larger diameter at its center than at its ends. In such case, the flighting can either be selectively twisted to conform to the tube during the assembly operation, though this procedure undesirably alters the length and spiral angle of the flighting, or the two can be assembled with gaps between the inner edge of the flighting and the surface of the tube, though such gaps will impair the conveying efficiency of the auger if sufficiently large to permit the material being conveyed to pass therethrough. Adding to this problem is the difficulty of forming the flighting with a uniform inner diameter properly corresponding with the diameter of the tube.

Additional problems arise from the presence of the longitudinal, overlapped seam on the core tube. Gaps are unavoidably created between the flighting and the underlying longitudinal edge of the tube adjacent to the seam, with the attendant problem already discussed. In addition, the raised longitudinal edge of the seam tends to disrupt the smooth flow of material adjacent to the tube, again impairing the efficiency of the conveyor.

Finally, the rolled tube construction is relatively low in strength and it is thus necessary to form such a tube of material having a greater thickness than otherwise desirable. Although certain of the foregoing problems can be eliminated by employing a seamless formed core tube, such seamless tubing is substantially more costly than roll-formed tubing.

SUMMARY OF THE INVENTION

Accordingly, it is the primary object of the present invention to provide an improved auger conveyor, and more particularly one that is less costly and easier to manufacture than those of conventional design. It is a further object to provide such an auger conveyor with a construction which eliminates the prior art problems involved in fitting the flighting to the core tube, and more particularly, which eliminates the problem resulting from the existence of gaps between the surface of the tube and the inner edge of the flighting. It is an additional object to provide such an auger wherein the core tube is provided with means for correctly and easily positioning the flighting thereon for assembly. It is another object to provide such an auger having a core tube with a smooth, seamless surface between longitudinally adjacent flights. It is yet a further object to provide such an auger that is substantially stronger than those of conventional design. A still further object is the provision of a high-strength auger housing having internally formed stripping means for the outer edge of the auger flighting.

These and other objects are achieved, according to the invention, by the provision of an auger conveyor comprising a core tube composed of a spiral-wound strip and having a raised, spiral seam on its external surface, and spiral flighting connected externally to the core tube and having a spiral inner edge parallel with and abutting the seam of the tube. The A spiral-wound construction of the core tube is substantially stronger than conventional rolled tube construction, thereby permitting the use of a thinner and consequently less expensive material. The raised, interlocked spiral seam interconnecting adjacent edges of the strip closes gaps which might otherwise exist between the flighting and tube, serves as means for correctly locating the flighting on the tube during assembly, and provides a built-up area for welding the flighting to the tube. By positioning the flighting along the seam, the surface of the tube between longitudinally adjacent flight portions is smooth and seamless, the auger, in this regard, possessing the advantage of a seamless-formed tube.

The core tube and flighting assembly is provided with a tubular housing composed also of a spiral-wound strip, and having a raised seam on its internal surface, the seam of the housing being wound in the opposite direction of the seam on the core tube and extending in close proximity to the outer edge of the flighting. As the core tube and flighting assembly rotates within the housing to advance material therethrough, the housing seam thus acts as a stripper for the flighting.

BRIEF DESCRIPTION OF THE DRAWING

The preferred embodiment of the invention will be described in conjunction with the accompanying drawing in which.

DESCRIPTION OF THE PREFERRED EMBODIMENT

Figure 1:
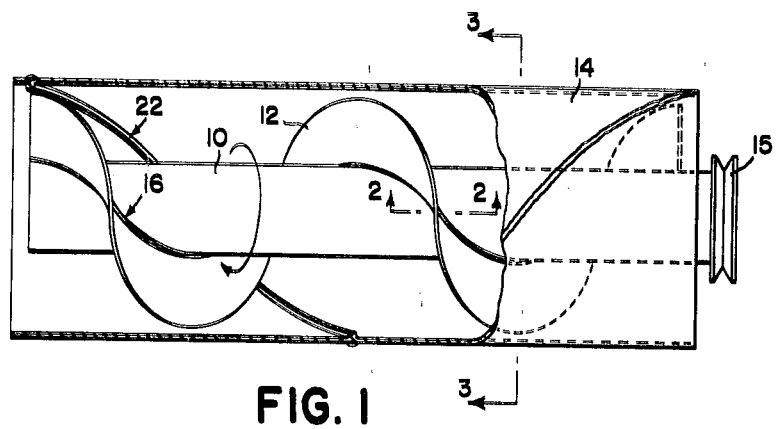
FIG. 1 is a side view of the auger conveyor of the present invention with a portion of the housing shown in longitudinal section for the sake of clarity.

A section of an auger conveyor constructed in accordance with the principles of the present invention is illustrated in FIG. 1 and comprises, generally, a cylindrical core tube 10, spiral flighting 12, and a cylindrical tubular housing 14 for the core tube and flighting assembly. Suitable drive means, in the form of a sheave 15 fixed to one end of the core tube 10, are operable to rotate the assembly relative to the housing in the direction indicated by the arrow in FIG. 1 and thereby advance material from right to left through the housing.

The core tube 10 is composed of a spiral-wound strip, the adjacent edges of the strip being connected to form a raised spiral seam 16 on the external surface of the tube. Though various types of seams may be employed in the construction of the tube, including both welded and mechanical, preferred is a mechanical seam having the overlapped and interlocked configuration shown in cross section in FIG. 2. Various methods of forming a tube with this construction are conventional in the art and thus need not be described.

Figure 2:
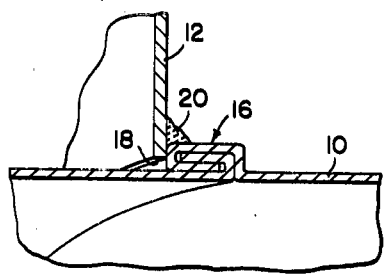
FIG. 2 is an enlarged sectional view taken along the line 2—2 of FIG. 1, and, FIG. 3 is a sectional view taken along the line 3—3 of FIG. 1.

The spiral flighting 12 is formed with a spiral inner edge 18 corresponding with the spiral of the seam 16. When assembled to the tube 10, the flighting 12 is positioned with its inner edge 18 parallel with and abutting the side of the seam 16, as shown in FIG. 2, the seam thus serving as means for correctly locating the flighting on the tube. As also shown in FIG. 2, the raised seam 16 serves to block any gaps which may exist between the inner edge 18 of the flighting and the surface of the tube. A third function served by the seam 16 in the assembly and also illustrated in the figure, is that of a base for the weld 20 securing the flighting rigidly to the tube. As will be apparent from the direction of rotation of the core tube and flighting assembly indicated in FIG. 1, the flighting is positioned forwardly of the seam 16 relative to the direction of movement of the material through the housing.

Figure 3:
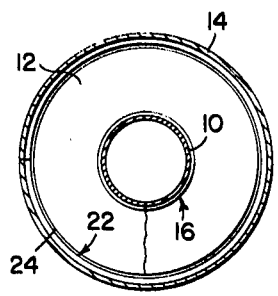

The tubular housing 14 is formed of a spiral-wound strip in a manner similar to the core tube 10, with the exceptions that the raised spiral seam 22 of the housing is formed on the internal surface rather than external surface thereof, and is wound in the direction opposite that of the core tube seam 16. The housing seam 22, like the core tube seam 16, may be of any suitable type. As shown best in FIG. 3, the seam 22 extends in close proximity to the outer edge 24 of the flighting 12 and, in operation of the conveyor, serves as a stripper therefor. It will be apparent that the core tube and flighting assembly conveyor is not limited to use in connection with the tubular housing as illustrated, and that various other housing configurations, such as an open trough, could be advantageously employed in certain applications.

I claim:
1. An auger conveyor comprising:
   a. an elongated cylindrical core tube composed of a spiral-wound strip and having a raised, spiral seam on its external surface;
   b. spiral flighting connected externally to the core tube and having a spiral inner edge parallel with and abutting the raised spiral seam of the tube;
   c. elongated housing means for the core tube and flighting assembly; and,
   d. drive means for rotating the core tube and flighting assembly relative to the housing to advance material therealong.
2. The invention defined in claim 1 wherein adjacent edges of the spiral-wound strip are overlapped and interlocked to form the spiral seam on the core tube.
3. The invention defined in claim 1 wherein the flighting is welded to the spiral seam on the core tube.
4. The invention defined in claim 1 wherein the housing means comprises an elongated cylindrical tube, the assembly being rotatable within the tube to advance material therethrough.
5. The invention defined in claim 4 wherein the housing tube is composed of a spiral-wound strip and has a raised, spiral seam on its internal surface extending in close proximity to the outer edge of the flighting and serving as a stripper therefor.
6. An auger conveyor comprising:
   a. a core tube composed of a spiral-wound strip, the adjacent edges of the strip being interconnected to form a spiral seam on the external surface of the tube; and
   b. external, spiral flighting having a spiral inner edge connected to the external surface of the tube and parallel with the spiral seam thereof.
7. The invention defined in claim 6 wherein the inner spiral edge of the flighting adjoins the spiral seam of the tube.
8. The invention defined in claim 6 wherein the spiral seam of the core tube is raised from the external surface thereof and abuts the inner spiral edge of the flighting.
9. The invention defined in claim 6 further including housing means for the core tube and flighting assembly, the assembly being rotatable relative to the housing means to advance material therealong.
10. The invention defined in claim 9 wherein the housing means comprises a tube composed of a spiral-wound strip and having a raised, spiral seam on its internal surface extending in close proximity to the outer edge of the flighting.
11. The invention defined in claim 10 wherein the housing tube and core tube seams are wound in opposite directions.
12. An auger conveyor comprising: a pair of continuous members, the first member being a strip spirally wound about an axis to form a solid cylindrical core, and having its adjacent spiralled edges joined to one another at a continuous spiralled juncture projecting radially from the core, and the other member being a spiral flighting having an inner continuous spiral edge at the same pitch as said juncture and extending around the core adjacent said juncture; and fastening means between the flighting and core at the inner edge and juncture.
13. An auger conveyor comprising: a strip spirally wound about an axis to form a solid cylindrical core, and having adjacent spiralled edges offset outwardly from the core and joined to one another to define a continuous spiralled juncture projecting radially from the core; a spiral flighting having an inner continuous spiral edge portion at the same pitch as said juncture and having a radial side thereof bearing against said juncture; and fastening means between the inner edge portion and said juncture.
14. The auger conveyor as set forth in claim 13 in which the juncture has a radial surface and said radial side of the inner edge portion engages it, and said radial surface is behind the inner edge portion with respect to the normal direction of movement of material by the auger conveyor.
15. An auger conveyor comprising: a first strip spirally wound about an axis to form a solid cylindrical core, and having adjacent spiralled edges offset outwardly from the core and joined to one another to define a continuous spiralled juncture projecting radially from the core; a second strip spirally wound about the aforesaid axis to form a solid cylinder concentric with and outward of the core; a spiral flighting having an inner continuous spiral edge portion at the same pitch as said juncture, the edge portion having a radial side thereof bearing against said juncture, the flighting further having an outer continuous spiral edge closely adjacent the internal surface of said cylinder; fastening means between the inner edge portion and said juncture; and drive means for rotating said core relative to the cylinder.

* * * * *